Dec. 26, 1961  A. J. SWIECICKI  3,014,743
COUPLING
Filed Dec. 14, 1959
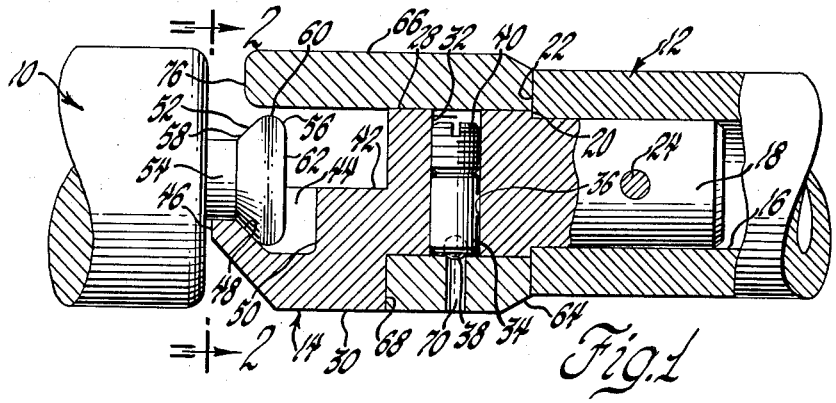
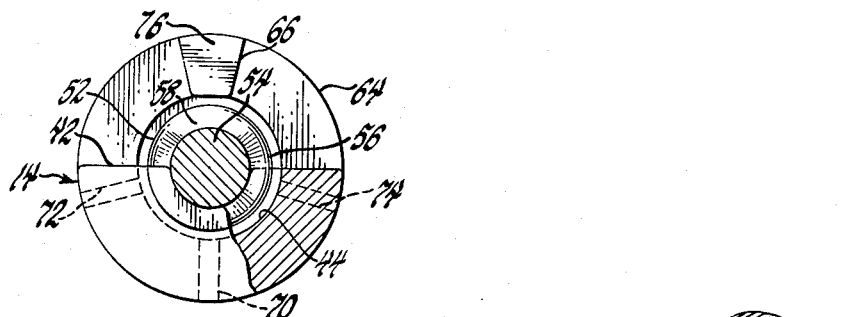
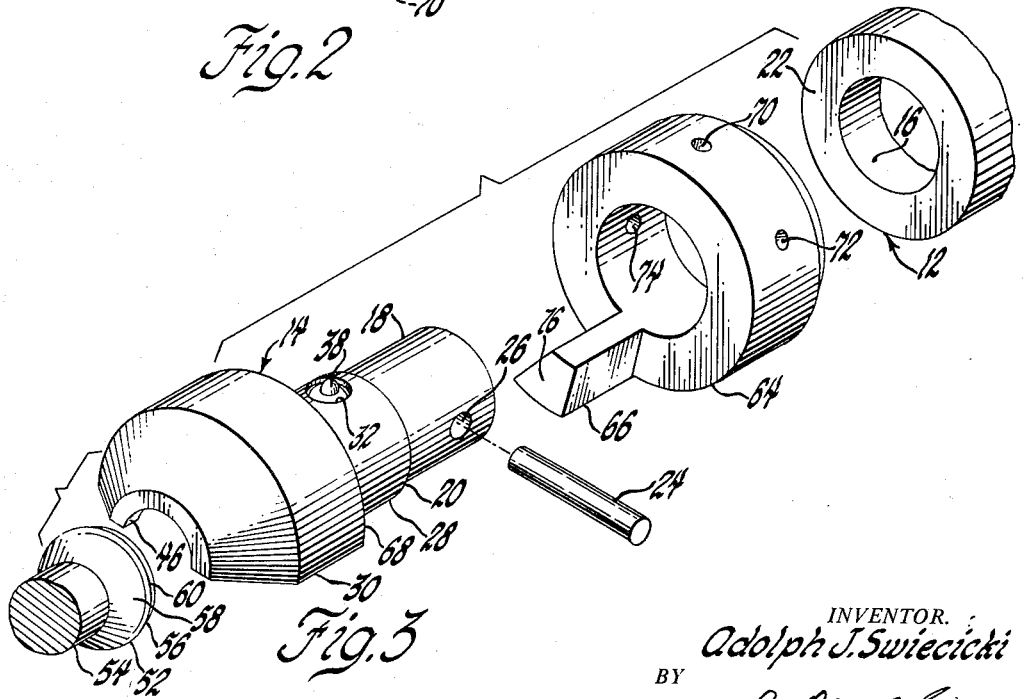
INVENTOR.
Adolph J. Swiecicki
BY
D. D. McGraw
ATTORNEY

United States Patent Office 3,014,743
Patented Dec. 26, 1961

3,014,743
COUPLING
Adolph J. Swiecicki, Clawson, Mich., assignor to General Motors Corporation, Detroit, Mich., a corporation of Delaware
Filed Dec. 14, 1959, Ser. No. 859,319
5 Claims. (Cl. 287—119)

The invention relates to a coupling for connecting two shafts together and more particularly for connecting the shafts so that they cannot be pulled apart axially but will be disconnected as one of the shafts is rotated about the coupling point relative to the other shaft in a manner which would normally strain or break either of the shafts or the coupling.

There are many industrial applications wherein two shafts or rods are to be connected together axially so that they can take an axle strain without becoming disconnected. At the same time side loads may be placed on such shafts so that one of the shafts would be bent or broken if the coupling is maintained. The coupling herein disclosed and claimed permits the quick connection of two shafts to each other and will hold these shafts together so long as the forces acting thereon tend to either move the shafts together along their common axis or to pull them apart along that axis. The coupling is so constructed as to become disconnected if one of the shafts tends to bend about the coupling point relative to the other shaft.

In the drawing:

FIGURE 1 is an elevation view of a coupling embodying the invention, with parts broken away and in section.

FIGURE 2 is a cross section view of the coupling of FIGURE 1 taken in the direction of arrows 2—2 of that figure and having parts broken away.

FIGURE 3 is an exploded view of the coupling of FIGURE 1 and illustrates the coupling elements isometrically.

The coupling illustrated in FIGURE 1 connects the shaft 10 to the shaft 12 along the common axis. It provides a quick connect and release coupling for these shafts. The coupling includes a socket member 14 which is attached to the shaft 12. In order to provide this attachment, shaft 12 is illustrated as having an internal passage 16 of sufficient length and diameter to receive the plug end 18 of socket member 14. Shoulder 20 is provided so that the end 22 of shaft 12 abuts the shoulder to position the socket member. An anchor pin 24 may extend through suitable apertures formed in shaft 12 which are in alignment with the transverse apertures 26 formed in the plug end 18. The pin 24 will then hold the socket member securely in place at the end of shaft 12.

The outer end of the socket member 14 includes sleeve support and detent section 28 adjacent the shoulder 20 and a female or socket section 30 adjacent the support and detent section 28. Section 28 is preferably round and may be concentric with the axis of shaft 12 and plug end 18. A transverse passage 32 is formed through section 28 and receives the ball plunger detent 34 therein. This plunger detent may be of any suitable structure and is illustrated being formed of a cylinder 36 in one end of which is received a ball 38 which may be spring loaded so that it is urged outwardly of the cylinder. A set screw 40 may engage suitable threads formed in the wall of passage 32 to position the detent 34 for reasons to be described.

The socket section 30 may be semi-circular in conformation so that the chordal surface 42 passes substantially through the axis of detent section 28 and shaft 12. A semi-circular recess 44 is formed internally of the socket section 30. The outer end 46 of section 30 is necked down so that the extreme end is formed as a somewhat smaller semi-circle than the larger portion of the section 30. This provides a curved inner surface 48 as part of recess 44 which, when viewed in longitudinal cross section in the manner illustrated in FIGURE 1, is at approximately a 45° angle to the axis of the socket member 14 and the shaft 12. The inner wall 50 of recess 44 is preferably axially spaced from the surface 48 so that recess 44 has an axial thickness to provide clearance for another member of the coupling which will be described.

Shaft 10 is provided with a headed male extension 52 which has a neck section 54 adjacent the end of the shaft and terminates in an enlarged head or retaining knob 56. The knob 56 is circular and generally frusto-conical in conformation so that the sloping conical surface 58 provides an outwardly flared construction which increases in diameter in a direction away from neck section 54. The periphery 60 of knob 56 is preferably rounded and the outer end 62 of the knob may be substantially flat.

Prior to assembly of the socket member 14 in the end of shaft 12, a rotatable sleeve 64 is received about the sleeve support and detent section 28 of the socket member. Sleeve 64 may be annularly formed and provided with a suitable outer gripping surface, such as knurls or other raised sections, so that it may be readily gripped for manual rotation. Sleeve finger 66 is integrally formed with sleeve 64 and extends from one side of the sleeve parallel to the sleeve axis. When the sleeve 64 is in the installed position on the socket member 14, sleeve finger 66 extends parallel to the semi-circular socket section 30 and may be circumferentially positioned anywhere within the semi-circular space remaining. Sleeve 64 is retained axially by the shoulder 68 which forms a portion of the socket section 30. The circular portion of the sleeve 64 is slightly shorter in axial length than the sleeve support and detent section 28 so that it may be rotated thereon. It is also provided with three circumferentially spaced and radially extending detent indexing apertures 70, 72 and 74 which may be aligned with the ball plunger detent 34 so that the ball 38 extends slightly into these apertures to resiliently lock the sleeve in a desired indexed circumferential position.

Prior to assembly of shaft 10 to shaft 12, sleeve 64 is rotated so that ball 38 of the detent mechanism 34 engages either indexing aperture 72 or indexing aperture 74. Sleeve finger 66 is thus held in position adjacent one side or the other of the semi-circular socket section 30 so that the recess 44 is clear. Shaft 10 is moved into generally axial alignment with shaft 12 and knob 56 is placed in recess 44 in the position shown in FIGURE 1. Sleeve 64 is then rotated so that ball 38 engages indexing aperture 70, thereby indexing and positioning sleeve finger 66 radially opposite the center of socket section 30 of member 14. This is the coupling locked position. If any force is exerted axially between shafts 10 and 12 tending to pull them apart, knob surface 58 will engage recess surface 48 and the knob will tend to move axially to the left as seen in FIGURE 1 and will also be cammed so as to have a radially directed component of motion toward sleeve finger 66. The peripheral edge 60 of knob 56 is sufficiently large to prevent the knob from escaping recess 44 since the knob will engage the end 76 of finger 66. If shaft 10 should be pivoted downwardly, however, as seen in FIGURE 1, knob 56 and neck 54 will be pivoted about the outer end 46 of the socket section 30, the portion of knob 56 received within recess 44 will then swing arcuately in a counterclockwise direction from the position illustrated in FIGURE 1 to extend further along an axial direction into that recess. The portion of knob 56 adjacent sleeve finger 66 will also pivot counterclockwise and will move axially out of the recess 44 and will clear the finger end 76. The knob will thus slip out of the socket and the coupling will be disconnected. Damage to the shafts and the coupling will therefore be averted.

While the coupling is not considered to be limited to any particular application, it has been found to be very useful when using shaft 12 as an arbor on which heavy rolls of material are to be loaded from a cantilever lifting arbor, such as shaft 10. When the cantilever arbor comprising shaft 10 is attached to a hoist, the hoist may be accidentally lowered while the coupling is connected, thereby potentially damaging the loading arbor as well as the lifting arbor. By the use of this coupling the lifting arbor is merely disconnected from the loading arbor without damage to either. The arbors may then be reconnected when the lifting arbor is again aligned with the loading arbor.

What is claimed is:

1. A quick connect and release coupling for a pair of normally axially aligned and relatively rotatable elements, said coupling comprising a headed male member on one of the elements and extending axially from one end thereof and a substantially semi-circular female member on the other of the elements and extending axially from one end thereof and means rotatable on said female member only for retaining said male member against axial removal from said female member in any relative axial rotational position of said elements while permitting removal of said male member from said female member when one of the elements becomes angularly misaligned relative to the other.

2. A coupling for connecting and disconnecting a first shaft and a second shaft, said coupling comprising a socket member having one end thereof secured to one of said shafts and a centrally disposed sleeve support and detent section and the other end thereof formed to provide a substantially semi-circular recessed socket section, a rotatable sleeve received about said centrally disposed sleeve support and detent section and having one end thereof in abutting relation with said one shaft and the other end thereof in abutting relation with said socket section and a finger extending therefrom parallel to the axis thereof and positioned to extend in an axial direction over substantially the entire recessed portion of said semi-circular socket section, said socket member sleeve support and detent section having a ball plunger detent received therein and extending radially outward to engage said rotatable sleeve, said rotatable sleeve having detent receiving apertures formed therein in indexed relation whereby said apertures cooperate with said detent to index said sleeve finger in a plurality of arcuately spaced positions relative to said recessed socket member with one of said positions being substantially opposite said recessed socket section, and a headed member on the other of said shafts and received within said recessed socket section and engaging said recessed socket section and said sleeve finger when said shafts are urged apart axially while said sleeve finger is positioned substantially opposite said recessed socket section and removable therefrom when said sleeve finger is rotated to another detent indexed position, said headed member pivoting out of said recessed socket section and disconnecting said shafts when one of said shafts is moved angularly toward said semi-circular recessed socket section relative to the other of said shafts.

3. A coupling for axially connecting and axially or angularly disconnecting first and second members, said coupling comprising, a socket member secured to one end of said first member and having a semi-circumferential lip section extending from a semi-peripheral portion thereof in an axially inward direction and defining a retaining member receiving recess, a retaining member on one end of said second member and having a neck section and an enlarged head section, said head section being received in said recess and said neck section being received on the axially inward extending end of said lip section, a retaining element rotatably mounted on said socket member intermediate said lip section and said first member, said lip section and said first member one end having shoulders formed thereon and oppositely engaging and axially locating said retaining element on said socket member, said retaining element having a retaining finger extending therefrom over said socket recess and when in the retaining position terminating in spaced relation to said lip section axially inward extending end a distance less than the transverse diameter of said retaining member head section and greater than the distance from said retaining member neck section engaging said lip section and to an opposite outer peripheral point on said retaining member head section whereby said retaining member is axially retained in said recess by said lip section and said retaining finger and is pivotally removable therefrom to disconnect said coupling when one of said members becomes angularly misaligned toward said lip section beyond the angle at which said retaining member head section clears said retaining fingers, said retaining element being rotatable to position said retaining finger to one circumferential side of said socket member lip section to permit transverse removal of said retaining members from said recess.

4. The coupling of claim 3 further comprising detent means selectively engageable with each of a plurality of detent receiving apertures formed in said retaining element and indexably locating said retaining finger in retaining member axial-retaining and retaining member transverse-releasing positions upon rotation of said retaining element.

5. The coupling of claim 3, said socket member intermediate said shoulders having detent means received radially inward of said rotatable retaining element and selectively engageable with each of a plurality of detent receiving apertures formed in said retaining element and indexably locating said retaining finger in retaining member axial-retaining and retaining member transverse-releasing positions upon rotation of said retaining element.

References Cited in the file of this patent

UNITED STATES PATENTS

| | | |
|---|---|---|
| 2,231,252 | Chesterman | Feb. 11, 1941 |
| 2,742,307 | Elsner | Apr. 17, 1956 |

FOREIGN PATENTS

| | | |
|---|---|---|
| 308,163 | Great Britain | Mar. 21, 1929 |